US012422766B2

(12) United States Patent
Yoshinaga et al.

(10) Patent No.: US 12,422,766 B2
(45) Date of Patent: Sep. 23, 2025

(54) FIXING DEVICE AND IMAGE FORMING APPARATUS INCORPORATING SAME

(71) Applicants: Hiroshi Yoshinaga, Chiba (JP); Takashi Seto, Kanagawa (JP); Ryohhei Sugiyama, Kanagawa (JP); Ryohei Matsuda, Kanagawa (JP); Yoshiki Yamaguchi, Kanagawa (JP)

(72) Inventors: Hiroshi Yoshinaga, Chiba (JP); Takashi Seto, Kanagawa (JP); Ryohhei Sugiyama, Kanagawa (JP); Ryohei Matsuda, Kanagawa (JP); Yoshiki Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/638,723

(22) Filed: Apr. 18, 2024

(65) Prior Publication Data

US 2024/0361712 A1 Oct. 31, 2024

(30) Foreign Application Priority Data

Apr. 27, 2023 (JP) ................................ 2023-073479

(51) Int. Cl.
*G03G 15/20* (2006.01)

(52) U.S. Cl.
CPC ..... *G03G 15/2028* (2013.01); *G03G 15/2025* (2013.01); *G03G 15/2064* (2013.01)

(58) Field of Classification Search
None
See application file for complete search history.

(56) References Cited

U.S. PATENT DOCUMENTS

2006/0216077 A1* 9/2006 Komuro ............... G03G 15/206 399/329
2010/0310290 A1* 12/2010 Sugawara ............... F16C 13/00 156/60
2014/0205334 A1* 7/2014 Kondoh ............ G03G 15/2053 399/329
2014/0226927 A1* 8/2014 Ishii ....................... F16C 13/02 384/291
2014/0286684 A1 9/2014 Takagi et al.
(Continued)

FOREIGN PATENT DOCUMENTS

JP 2005-084160 A 3/2005
JP 2014-018621 A 2/2014
(Continued)

OTHER PUBLICATIONS

Machine translation of Priority Document.*

*Primary Examiner* — Sevan A Aydin
(74) *Attorney, Agent, or Firm* — XSENSUS LLP

(57) ABSTRACT

A fixing device includes a fixing rotator, a heater, a pressure rotator, a nip formation pad, and a slide aid sheet. The fixing rotator is rotatable in a rotation direction. The heater heats the fixing rotator. The pressure rotator contacts an outer circumferential face of the fixing rotator. The nip formation pad is inside a loop of the fixing rotator to form a nip between the fixing rotator and the pressure rotator. The slide aid sheet is on the nip formation pad and faces the fixing rotator. The slide aid sheet includes a carbon fiber extending in a width direction orthogonal to a rotation direction of the fixing rotator.

8 Claims, 4 Drawing Sheets

(56) References Cited

U.S. PATENT DOCUMENTS

| | | | | |
|---|---|---|---|---|
| 2015/0165759 | A1* | 6/2015 | Landa | B41J 2/0057 347/103 |
| 2017/0037227 | A1* | 2/2017 | Tanaka | G03G 9/08782 |
| 2017/0269499 | A1* | 9/2017 | Ishihara | G03G 9/0926 |
| 2020/0117126 | A1 | 4/2020 | Hase et al. | |
| 2020/0341419 | A1 | 10/2020 | Shimada et al. | |
| 2021/0173331 | A1* | 6/2021 | Honda | G03G 15/2064 |
| 2021/0191301 | A1 | 6/2021 | Fujimoto et al. | |
| 2021/0311420 | A1 | 10/2021 | Yoshinaga et al. | |
| 2022/0026834 | A1 | 1/2022 | Yoshinaga | |
| 2022/0281234 | A1 | 9/2022 | Yoshinaga | |
| 2022/0291613 | A1 | 9/2022 | Yamaguchi et al. | |
| 2023/0093465 | A1 | 3/2023 | Kabata et al. | |
| 2023/0297010 | A1 | 9/2023 | Daisuke et al. | |
| 2023/0297011 | A1 | 9/2023 | Shiodera et al. | |
| 2023/0297015 | A1 | 9/2023 | Hiroshi et al. | |
| 2023/0297026 | A1 | 9/2023 | Andoh et al. | |
| 2023/0300269 | A1 | 9/2023 | Andoh et al. | |
| 2023/0305451 | A1 | 9/2023 | Sugiyama et al. | |
| 2023/0324838 | A1 | 10/2023 | Masahiro et al. | |
| 2023/0350329 | A1 | 11/2023 | Toshiyuki et al. | |
| 2023/0359142 | A1 | 11/2023 | Imada et al. | |
| 2024/0004329 | A1 | 1/2024 | Yoshinaga et al. | |
| 2024/0036500 | A1 | 2/2024 | Samei et al. | |

FOREIGN PATENT DOCUMENTS

| | | | |
|---|---|---|---|
| JP | 2014-186211 | A | 10/2014 |
| JP | 2015-230359 | A | 12/2015 |
| JP | 2017-003722 | A | 1/2017 |
| JP | 2018-036557 | A | 3/2018 |
| JP | 2020-154074 | A | 9/2020 |
| JP | 2023-005806 | A | 1/2023 |

* cited by examiner

FIXING DEVICE AND IMAGE FORMING APPARATUS INCORPORATING SAME

CROSS-REFERENCE TO RELATED APPLICATION

This patent application is based on and claims priority pursuant to 35 U.S.C. § 119 (a) to Japanese Patent Application No. 2023-073479, filed on Apr. 27, 2023, in the Japan Patent Office, the entire disclosure of which is hereby incorporated by reference herein.

BACKGROUND

Technical Field

Embodiments of the present disclosure relate to a fixing device and an image forming apparatus including the fixing device.

Related Art

An electrophotographic image forming apparatus includes a fixing device. Such a fixing device employs, for example, a Quick Start-Up Direct Heating (QSU-DH) system. The QSU-DH system includes a nip formation pad, a pressure rotator such as a pressure roller, and a fixing rotator such as a fixing belt. The fixing rotator has a thin cylindrical shape and is sandwiched between the nip formation pad and a pressure rotator to form a nip between the fixing rotator and the pressure rotator. Such a fixing device includes a thermal equalizer or a slide aid sheet holding lubricant between the nip formation pad and the fixing rotator.

SUMMARY

This specification describes an improved fixing device that includes a fixing rotator, a heater, a pressure rotator, a nip formation pad, and a slide aid sheet. The fixing rotator is rotatable in a rotation direction. The heater heats the fixing rotator. The pressure rotator contacts an outer circumferential face of the fixing rotator. The nip formation pad is inside a loop of the fixing rotator to form a nip between the fixing rotator and the pressure rotator. The slide aid sheet is on the nip formation pad and faces the fixing rotator. The slide aid sheet includes a carbon fiber extending in a width direction orthogonal to a rotation direction of the fixing rotator.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
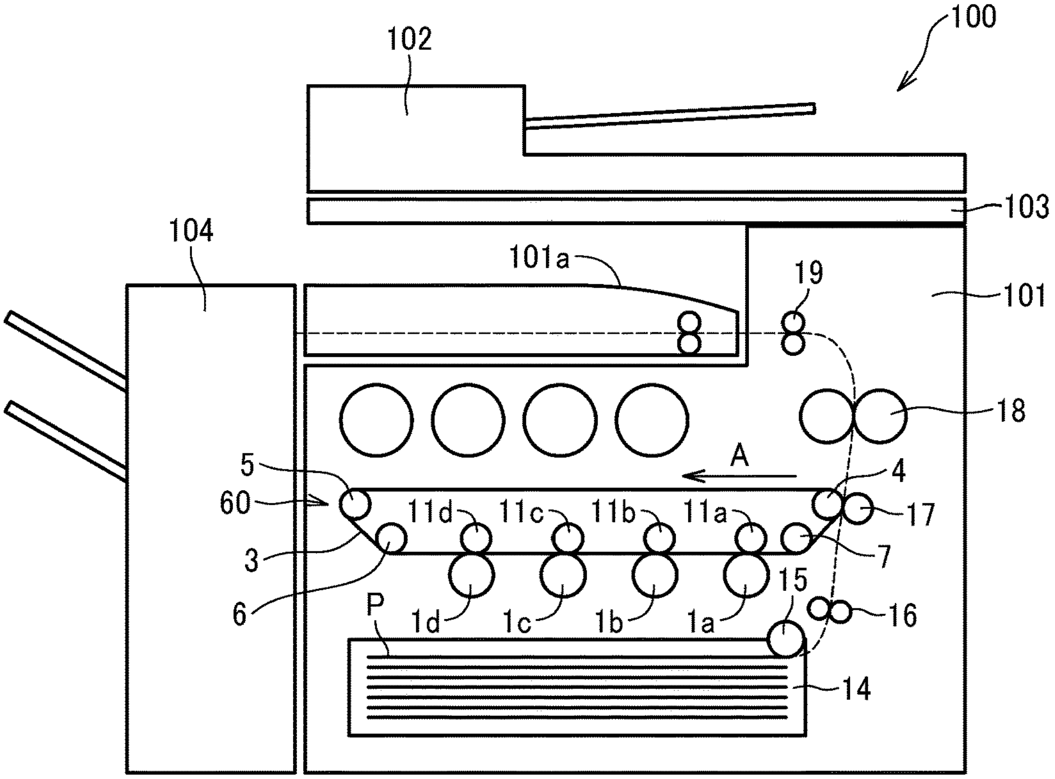
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms “a,” “an,” and “the” are intended to include the plural forms as well, unless the context clearly indicates otherwise.

Embodiments of the present disclosure are described below in detail with reference to the drawings. Identical reference numerals are assigned to identical or equivalent components and a description of those components may be simplified or omitted.

The structure of an image forming apparatus is described below.

As the image forming apparatus according to an embodiment of the present disclosure, an electrophotographic image forming apparatus 100 is described below. FIG. 1 is a schematic diagram illustrating a configuration of the image forming apparatus 100 according to the present embodiment. The image forming apparatus 100 includes a main body 101, an automatic document feeder (ADF) 102, a scanner 103 as an image reading device, and a post-processing apparatus such as a finisher 104.

The image forming apparatus 100 includes an operation panel. The operation panel allows a user to change paper settings, copy image quality, and scanner settings. The image forming apparatus 100 can receive and perform a print job transmitted from an external apparatus such as a personal computer.

The image forming apparatus 100 executes printing in accordance with a print mode set by a printer driver. The automatic document feeder (ADF) 102 includes a document feed tray to set a document, a pickup roller that picks up the document from the document feed tray, and an ejection tray to which the document is ejected.

The scanner 103 includes a light source that irradiates the document with light through a platen, a photoelectric conversion element that receives light from the document and converts the light into an electrical signal, and an A/D converter that converts the electrical signal into digital data. The post-processing apparatus such as the finisher 104 has a stapler function, a punching function, and a sheet folding function as post-processing for sheets on which an image has been formed.

The stapler can bind sheets ejected from the main body 101 in a predetermined number of sheets in accordance with instructions included in print job data. A punch can punch a hole at a predetermined position on a sheet or a predetermined number of sheets ejected from the image forming apparatus 100 in accordance with instructions included in the print job data.

The main body 101 includes four photoconductors 1*a* to 1*d* as a first to fourth image bearers. The main body includes an intermediate transfer device 60 that is a belt device including an intermediate transfer belt 3 as a belt above the four photoconductors 1*a* to 1*d*.

Different color toner images are formed on the four photoconductors 1*a* to 1*d*. Black toner images, cyan toner images, magenta toner images, and yellow toner images are formed on the four photoconductors 1*a*, 1*b*, 1*c*, and 1*d* according to the present embodiment, respectively. The photoconductors 1*a*, 1*b*, 1*c*, and 1*d* in FIG. 1 are drum-shaped photoconductors but may be photoconductor belts each having an endless belt shape, being wound around multiple rollers, and being driven to rotate by a driving roller.

An intermediate transfer belt 3 as an intermediate transferor is disposed to face the first to fourth photoconductors 1*a* to 1*d*. In FIG. 1, the four photoconductors 1*a* to 1*d* are in contact with the surface of the intermediate transfer belt 3.

The intermediate transfer belt 3 illustrated in FIG. 1 is wound around support rollers, which are a secondary transfer facing roller 4, a tension roller 5, a backup roller 6, and an entrance roller 7. The secondary transfer facing roller 4 that functions as one of the support rollers is a drive roller that is driven by a drive source.

As the secondary transfer facing roller 4 rotates, the intermediate transfer belt 3 is rotated in a direction indicated by arrow A in FIG. 1.

The intermediate transfer belt 3 may have either a multilayer structure or a single-layer structure. The multiple layers preferably include a base layer having an outer circumferential surface coated by a smooth coating layer made of, e.g., fluorine-based resin. The base layer may be made of, for example, a stretch-resistant fluororesin, polyvinylidene difluoride (PVDF) sheet, or polyimide resin. The single layer may be preferably made of, for example, PVDF, polycarbonate (PC), or polyimide.

Regardless of the color of toner, the configuration and operation to form toner images on the four photoconductors 1*a*, 1*b*, 1*c*, and 1*d* are similar. Similarly, the configuration and operation to transfer the toner images onto the intermediate transfer belt 3 are similar regardless of the color of the toner. Accordingly, a description is given of how a yellow toner image is formed on the photoconductor 1*d* for forming the yellow toner image out of the four photoconductors 1*a*, 1*b*, 1*c*, and 1*d* and how the yellow toner image is transferred from the photoconductor 1*d*, which is disposed extremely upstream in a belt surface moving direction of the intermediate transfer belt 3, to the intermediate transfer belt 3. Descriptions of the configuration and operation regarding the photoconductors 1*a*, 1*b*, and 1*c* forming other toner color images (cyan toner image, magenta toner image, and black toner image) are omitted to avoid redundancy.

The photoconductor 1*d* for forming a yellow toner image rotates clockwise in FIG. 1. Hereinafter, the photoconductor 1*d* for forming a yellow toner image is simply referred to as the photoconductor 1*d*. As the photoconductor 1*d* is rotated, the surface of the photoconductor 1*d* is irradiated with light from a static eliminator. Consequently, the surface potential of the photoconductor 1*d* is initialized. The photoconductor 1*d* is further rotated and reaches a position where the photoconductor 1*d* faces a charging device, and the charging device uniformly charges the initialized outer circumferential surface of the photoconductor 1*d* to a given polarity (in the present embodiment, to a negative polarity).

An exposure device disposed below the photoconductors 1*a*, 1*b*, 1*c*, and 1*d* emits laser light beams onto the charged outer circumferential surfaces of the respective photoconductors 1*a*, 1*b*, 1*c*, and 1*d* according to black, cyan, magenta, and yellow image data contained in image data sent from the external device, respectively, thus forming electrostatic latent images on the respective outer circumferential surfaces. In the image forming apparatus 100 of FIG. 1, the exposure device as a laser writer emits the laser beams. Alternatively, the exposure device may include a light-emitting diode (LED) array and an imaging device.

The electrostatic latent image formed on the photoconductor 1*d* is visualized as a visible yellow toner image by a developing device for yellow, and developing devices for other colors each having the same configuration as the developing device for yellow are disposed around the photoconductors for other colors, respectively. Further, primary transfer rollers 11*a*, 11*b*, 11*c*, and 11*d* are disposed inside a loop formed by the intermediate transfer belt 3. The primary transfer rollers 11*a*, 11*b*, 11*c*, and 11*d* are disposed opposing (facing) the photoconductors 1*a*, 1*b*, 1*c*, and 1*d*, respectively, via the intermediate transfer belt 3.

The primary transfer roller 11*d* is brought to contact the back surface of the intermediate transfer belt 3, forming a transfer nip region between the photoconductor 1*d* and the intermediate transfer belt 3 properly. A primary transfer bias is applied to the primary transfer roller 11*d*. The primary transfer bias has a positive polarity in the present embodiment, that is opposite a toner charging polarity of toner contained in the yellow toner image formed on the surface of the photoconductor 1*d*.

Thus, a transfer electrical field is generated between the photoconductor 1*d* and the intermediate transfer belt 3. The yellow toner image on the photoconductor 1*d* is electrically (electrostatically) transferred onto the intermediate transfer belt 3 that is rotated in synchronization with the photoconductor 1*d*. After the yellow toner image is transferred onto the intermediate transfer belt 3, a cleaning device for yellow removes residual toner remaining on the surface of the photoconductor 1*d* to clean the surface of the photoconductor 1*d*.

Similarly, a black toner image, a cyan toner image, and a magenta toner image are respectively formed on the photoconductors 1*a*, 1*b*, and 1*c*, and the toner images of respective colors are sequentially superimposed and electrically (electrostatically) transferred one after another on the yellow toner image on the intermediate transfer belt 3.

The image forming apparatus 100 has two types of drive modes, which are a full color mode in which four color toners are used and a monochrome mode in which black color toner alone is used. In the full color mode, the intermediate transfer belt 3 and each of the four photoconductors 1*a*, 1*b*, 1*c*, and 1*d* come into contact with each other, and the four color toner images are transferred onto the intermediate transfer belt 3.

By contrast, in the monochrome mode, the photoconductor 1*a* alone contacts the intermediate transfer belt 3, so that black toner alone is transferred to the intermediate transfer belt 3. At this time, the three photoconductors 1*b*, 1*c*, and 1*d* for cyan toner image, magenta toner image, and yellow toner image are not in contact with the intermediate transfer belt 3, and a contact-separation mechanism separates the three primary transfer rollers 11*b*, 11*c*, and 11*d* from the three photoconductors 1*b*, 1*c*, and 1*d*. In order to reliably separate the intermediate transfer belt 3 from the three photoconductors 1*b*, 1*c*, and 1*d* for cyan toner image, magenta toner image, and yellow toner image, the backup roller 6 is moved to change the profile of the intermediate transfer belt 3.

As illustrated in FIG. 1, the image forming apparatus 100 further includes a sheet feeding device 14 in a lower portion of the main body 101. The sheet feeding device 14 includes a sheet feed roller 15. As the sheet feed roller 15 rotates, a recording sheet P as a recording medium is fed out upward in FIG. 1. The recording sheet P fed out from the sheet feeding device 14 contacts a pair of registration rollers 16 and stops temporarily.

A portion of the intermediate transfer belt 3 is wound around the secondary transfer facing roller 4. The portion of the intermediate transfer belt 3 contacts a secondary transfer roller 17 that functions as a secondary transferor disposed facing the secondary transfer facing roller 4. Thus, a secondary transfer nip is formed between the secondary transfer roller 17 and the secondary transfer facing roller 4 via the intermediate transfer belt 3.

The recording sheet P that has contacted the pair of registration rollers 16 is conveyed to the secondary transfer nip at a given timing. At this time, a given transfer voltage is applied to the secondary transfer roller 17, so that a composite toner image formed by overlaying the single color toner images on the surface of the intermediate transfer belt 3 is secondarily transferred onto the recording sheet P.

The recording sheet P on which the composite toner image is formed by secondary transfer is further conveyed upward in the image forming apparatus 100 to pass a fixing device 18. When passing the fixing device 18, the composite toner image on the recording sheet P is fixed to the recording sheet P by application of heat and pressure in the fixing device 18. The recording sheet P that has passed through the fixing device 18 is ejected to the outside of the image forming apparatus 100 by a pair of sheet ejection rollers 19 disposed in a sheet ejection device so that the recording sheet P is stacked on a sheet ejection tray 101*a* that is a top portion of the main body 101. After the toner image is transferred onto the recording sheet P, some toner remains as transfer residual toner on the surface of the intermediate transfer belt 3. The transfer residual toner is removed from the intermediate transfer belt 3 by a belt cleaning device.

The following describes the fixing device 18 according to an embodiment of the present disclosure.

Figure 2:
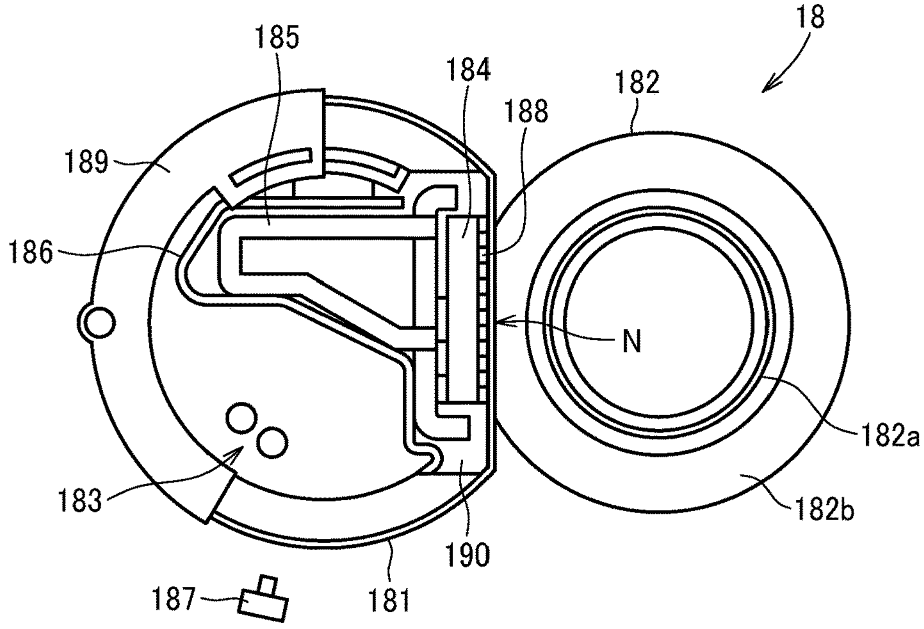
FIG. 2 is a schematic diagram of a configuration of a fixing device according to an embodiment of the present disclosure used in the image forming apparatus of FIG. 1.

FIG. 2 is a schematic diagram of the fixing device 18 according to the present embodiment.

The fixing device 18 according to the present embodiment includes a fixing belt 181, a pressure roller 182, two heaters 183, and a nip formation pad 184. The fixing belt 181 is an endless belt that functions as a fixing rotator. Each of the two heaters 183 functions as a heater to heat the fixing belt 181. The nip formation pad 184 and pressure roller 182 are disposed so as to face each other via the fixing belt 181. The nip formation pad 184 is disposed in contact with an inner circumferential surface of the fixing belt 181, to sandwich (hold) the fixing belt 181 with the pressure roller 182. By so doing, a fixing nip N is formed between the pressure roller 182 and the fixing belt 181 at a portion contacting the nip forming face of the nip formation pad 184.

In FIG. 2, the fixing nip N has a flat shape but may have a concave shape or other shapes. The fixing nip N having the concave shape directs the leading edge of the recording sheet toward the pressure roller 182 as the recording sheet is ejected from the fixing nip N, which gives an advantage that separation of the recording sheet from the fixing belt 181 is facilitated, and jamming of the recording sheet is prevented.

The nip formation pad 184 extends in a width direction of the fixing belt 181 or in a rotational axis direction of the pressure roller 182 and has a thickness of 1 to 10 mm to increase the cross-sectional area of the nip formation pad 184 and increase the amount of heat transfer in the longitudinal direction of the nip formation pad 184. The nip formation pad 184 may be made of multiple materials, and one of the materials is a heat-resistant resin having a heat-resistant temperature of 200° C. or higher, which can withstand the pressure from the pressure roller 182 even in the toner fixing temperature range. Specific examples of the heat-resistant resin include polyether sulfone (PES), polyphenylene sulfide (PPS), liquid crystal polymer (LCP), polyether nitrile (PEN), polyamide imide (PAI), and polyether ether ketone (PEEK).

Other materials of the nip formation pad 184 may be materials (good heat conductors) having heat resistance and high thermal conductivity, for example, as illustrated in Table 1 below.

TABLE 1

| Material | Thermal conductivity (W/m K) |
|---|---|
| Carbon nanotube | 3000 to 5500 |
| Graphite sheet | 700 to 1750 |
| Silver | 420 |
| Copper | 398 |
| Aluminum | 236 |

The fixing belt 181 is an endless belt or film made of a metal material, such as nickel or steel use stainless (SUS), or a resin material such as polyimide. The fixing belt 181 includes a base layer and a release layer. The release layer, as an outer surface layer of the fixing belt 181, is made of perfluoroalkoxy alkane (PFA) or polytetrafluoroethylene (PTFE) to facilitate separation of toner of the toner image on the recording sheet from the fixing belt 181.

An elastic layer made of, e.g., silicone rubber may be interposed between the base layer and the release layer of the fixing belt 181. If the fixing belt 181 does not include the elastic layer, the fixing belt 181 has a decreased thermal capacity that enhances the fixing property. However, slight surface asperities in the fixing belt 181 may be transferred onto the toner image on the sheet S, resulting in a variation in gloss of the solid toner image that may appear as an orange peel image on the recording sheet P.

In order to address this situation, the fixing belt 181 preferably includes the elastic layer having a thickness not smaller than 100 μm, for example. As the elastic layer deforms, the elastic layer absorbs the slight surface asperities in the fixing belt 181, thereby preventing formation of the faulty orange peel image.

The heaters 183 are disposed opposite the inner circumferential surface of the fixing belt 181, and radiant heat radiated by the heaters 183 heats the fixing belt 181. The heaters 183 according to the present embodiment are halogen heaters. However, the type and number of heaters 183 are not fixed. In other words, the type and number of heaters 183 depend on the fixing device 18 according to the present embodiment. For example, alternative to the halogen heaters 183, a heater such as an induction heater (IH), a resistive heat generator, or a carbon heater is applied.

The pressure roller 182 is an elastic roller in which the periphery of a cored bar 182*a* is covered by an elastic rubber layer 182*b* The surface layer of the pressure roller 182 has a hardness lower than a hardness of the nip forming surface of the nip formation pad 184. The elastic rubber layer 182*b* of the pressure roller 182 may be solid rubber but is preferably sponge rubber.

The sponge rubber is preferable to the solid rubber because the sponge rubber has enhanced thermal insulation that draws less heat from the fixing belt 181 to the pressure roller 182. The pressure roller 182 may include a surface release layer made of PFA or PTFE to facilitate separation of the recording sheet P from the pressure roller 182.

The pressure roller 182 includes a shaft that is supported by a housing of the fixing device 18. As a driving force is generated by a drive source such as a motor mounted on the main body 101 of the image forming apparatus 100, the driving force is transmitted to the pressure roller 182 through a gear train, and the pressure roller 182 rotates in a rotational direction. In the fixing nip N, the rotation driving force is transmitted from the pressure roller 182 to the fixing belt 181. Rotations of the pressure roller 182 rotate the fixing belt 181. While the fixing belt 181 rotates, holders (in other words, flanges) guide both ends of the fixing belt 181 in a portion other than the fixing nip N.

While the fixing belt 181 rotates, the inner circumferential surface of the fixing belt 181 slides on a slide aid sheet 188 that is on a nip formation surface of the nip formation pad 184. A slide aid sheet 188 is disposed between the nip formation surface of the nip formation pad 184 and the inner circumferential surface of the fixing belt 181 to enhance slidability.

The nip formation pad 184 is fixed on a stay 185, and the periphery of the nip formation pad 184 is surrounded and supported by guides 190. The guides 190 hold the nip formation pad 184 and guide the rotation of the fixing belt 181 at the entrance of the fixing nip N and the exit of the fixing nip N.

The stay 185 prevents the nip formation pad 184 from being bent by the pressure applied by the pressure roller 182 to form a uniform nip width in the width direction of the fixing belt 181. The stay 185 that receives the pressure applied by the pressure roller 182 enables obtaining a pressure in the fixing nip N to fuse and fix toner of the toner image onto the recording sheet P. Holders hold and fix both ends of the stay 185 to position the stay 185.

Bending an iron plate or a stainless steel plate forms the stay 185. Since the iron plate or the stainless steel plate has a thickness of 2 to 4 mm, the stay 185 has a large thermal capacity.

To prevent the large thermal capacity of the stay 185 from consuming unnecessary energy, a reflector 186 is provided between the heaters 183 and the stay 185 in the present embodiment. The reflector 186 prevents the stay 185 from being heated by radiant heat from the heaters 183 and consuming the unnecessary energy. Instead of the reflector 186, the surface of the stay 185 may be subjected to heat insulation treatment or mirror finish treatment.

The nip formation pad 184 according to the present embodiment has a substantially flat nip formation surface. Since the formation surface of the nip formation pad 184 has higher hardness than the hardness of the elastic rubber layer 182*b* of the pressure roller 182, the elastic rubber layer 182*b* of the pressure roller 182 elastically deforms along the nip formation surface of the nip formation pad 184.

As a result, the fixing nip N in the present embodiment has a substantially flat face along the nip formation surface (that is a flat surface) of the nip formation pad 184. The nip formation surface may not be completely flat. As long as the curvature is sufficiently smaller than the curvature of a known fixing nip formed by two rollers, the nip formation surface may have a slight curved shape such as a convex shape or a concave shape.

The fixing device 18 according to the present embodiment that is configured as described above has a low thermal capacity of a structure around the fixing belt 181 and efficiently heats the fixing belt 181 in a short time. In the present embodiment, the warm-up operation is performed to raise the temperature of the fixing belt 181 to the specified fixing temperature before starting the image forming operation. Since the fixing device 18 according to the present embodiment has the structure around the fixing belt 181 having the low thermal capacity, the heaters can heat the fixing belt 181 to the specified fixing temperature in a short time, which can reduce the period of the warm-up time.

The amount of power supplied to the heaters 183 is determined according to a difference between a target temperature and a temperature obtained by detecting the surface temperature of the fixing belt 181 with thermopiles 187. However, at the start of printing and at the start of warm-up, a predetermined amount of power may be input to the heaters 183. The rated power of the heaters is 1200 W, and the power supply voltage is 100V. When the power is always supplied to the heaters, a current 12A flows, and the power consumption becomes 1200 W.

The following describes the slide aid sheet 188.

Figure 3:
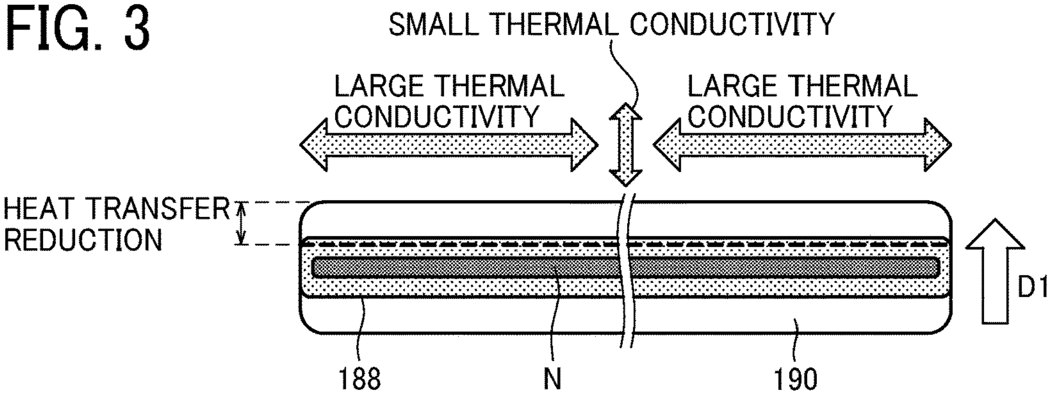
FIG. 3 is a view of a slide aid sheet facing a fixing belt.

As illustrated in FIGS. 2 and 3, the slide aid sheet 188 is disposed on the side of the nip formation pad 184 that is the side facing the fixing belt 181, in other words, between the nip formation surface of the nip formation pad 184 and the inner peripheral surface of the fixing belt 181 in order to enhance slidability. The slide aid sheet 188 is fixed to the nip formation pad 184 by an appropriate fixing method.

The fixing method to fix the slide aid sheet 188 is not particularly limited. For example, the slide aid sheet 188 may be wound around the nip formation pad 184 or may be fixed to the nip formation pad 184 by an adhesive tape (for example, a double-sided tape) or a fastener such as a screw.

Figure 4:
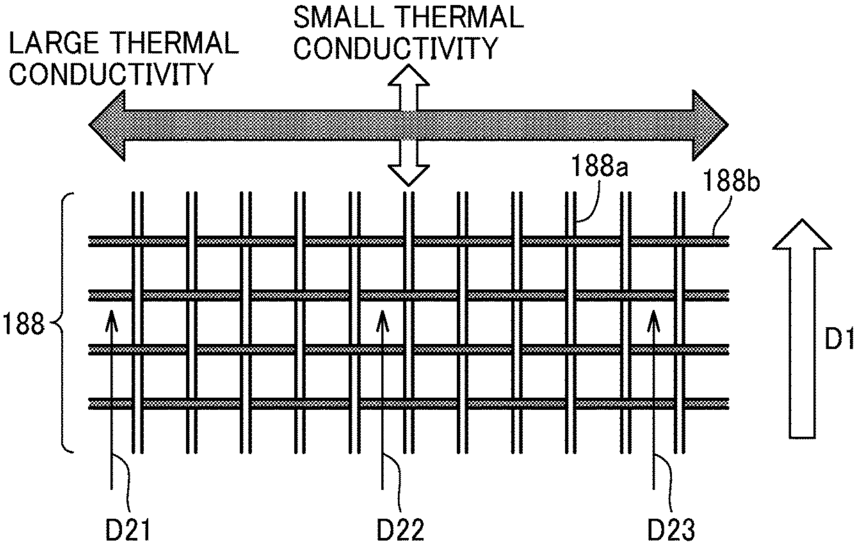
FIG. 4 is an enlarged view of a part of the slide aid sheet of FIG. 3.

As a material of the slide aid sheet 188, a material obtained by braiding carbon fibers or PTFE fibers as illustrated in FIG. 4 can be exemplified. In this case, the unevenness of the fibers can reduce an area of the slide aid sheet 188 in contact with the fixing belt 181 and further reduce the frictional resistance. In addition, the material obtained by braiding fibers can hold lubricant (that is liquid or semi-solid) such as silicone oil, silicone grease, or fluorine grease for a long period of time and maintain the reduction in frictional resistance due to the lubricant effect over time.

The slide aid sheet in a comparative example is woven only with fibers of a heat-resistant resin such as a silicone resin or a fluororesin. Such a heat-resistant resin can be expected to have a certain degree of lubricant retention but has a small thermal conductivity due to the characteristics of the fiber. As a result, the slide aid sheet made of the heat-resistant resin has a disadvantage in that an excessive temperature rise easily occurs at the end portion of the fixing belt that is a non-sheet-passing region of the fixing belt. The excessive temperature rise at the end portion of the fixing belt may damage the fixing belt and the pressure roller.

To prevent the excessive temperature rise, the slide aid sheet 188 in the present embodiment includes carbon fibers. Since the carbon fibers have large thermal conductivity, the carbon fibers can provide an effect of reducing the excessive temperature rise at the end of the fixing belt that is the non-sheet-passing region of the fixing belt similar to a thermal equalization member such as a thermal equalization pad in the related art.

Specifically, the weft 188*b* of the slide aid sheet 188 includes the carbon fibers as illustrated in FIG. 4, and a warp 188*a* is made of glass fibers or fibers made of heat-resistant resin such as silicone resin or fluororesin, which is the same as the comparative example. All (100%) of the weft 188*b* may be carbon fibers. A part or most of the weft 188*b* may be carbon fibers, and the remainder may be heat-resistant plastic fibers or glass fibers.

The carbon fibers may be polyacrylonitrile carbon fibers (PAN), pitch-based carbon fibers (PITCH), or their mixture. The pitch-based carbon fibers having an excellent thermal conductivity and an excellent wear resistance is preferable. As the heat-resistant resin, thermosetting polyimide, thermoplastic polyimide, polyamide, polyamide-imide, and fluorine-containing elastomer may also be used.

The warp 188*a* and the weft 188*b* are woven so as to be orthogonal to each other. The fixing belt 181 rotates in a running direction D1 in FIG. 4. The lubricant such as oil held by the slide aid sheet 188 also flows in the direction of the warp 188*a* or distances D21 to D23 each of which is substantially the same direction as the running direction D1.

The weft 188*b* extends in the longitudinal direction of the nip formation pad 184 that is the direction orthogonal to the conveyance direction of the recording sheet P and the direction orthogonal to a rotation direction of the fixing belt 181 as the fixing rotator. The warp 188*a* extends in a short-side direction of the nip formation pad 184 that is the conveyance direction of the recording sheet P or the running direction D1 of the fixing belt 181. The running direction D1 of the fixing belt is the rotation direction of the fixing belt 181 as the fixing rotator and is the conveyance direction of the recording medium. In the present disclosure, the width direction of the fixing belt 181 is defined as a direction orthogonal to the rotation direction of the fixing belt 181. In FIG. 3, a width direction of the slide aid sheet 188 is a horizontal direction that is also the width direction of the fixing belt 181. As illustrated in FIG. 3, the carbon fibers transmit heat in the width direction of the slide aid sheet 188 and reduce the temperature rise at the end portions of the fixing belt 181.

The present inventors conducted the following experiments to examine the effect of the weft 188*b* including the carbon fibers. The present inventors wove the warp 188*a* including resin and the weft including the carbon fibers to prepare the slide aid sheet 188 and attached the woven slide aid sheet 188 to the fixing device 18. Subsequently, the image forming apparatus performed continuous image forming operations on 500 small sheets having a width of 105 mm. Immediately after the image forming apparatus completes the image forming operations, the present inventors measured a temperature distribution of the fixing belt in the longitudinal direction of the fixing belt. Similarly, the present inventors prepared the slide aid sheet 188 made of resin (in other words, not including the carbon fibers) and attached the woven slide aid sheet 188 to the fixing device 18. Subsequently, the image forming apparatus performed continuous image forming operations on 500 small sheets having a width of 105 mm, and the present inventors measured a temperature distribution of the fixing belt in the longitudinal direction.

Figure 5:
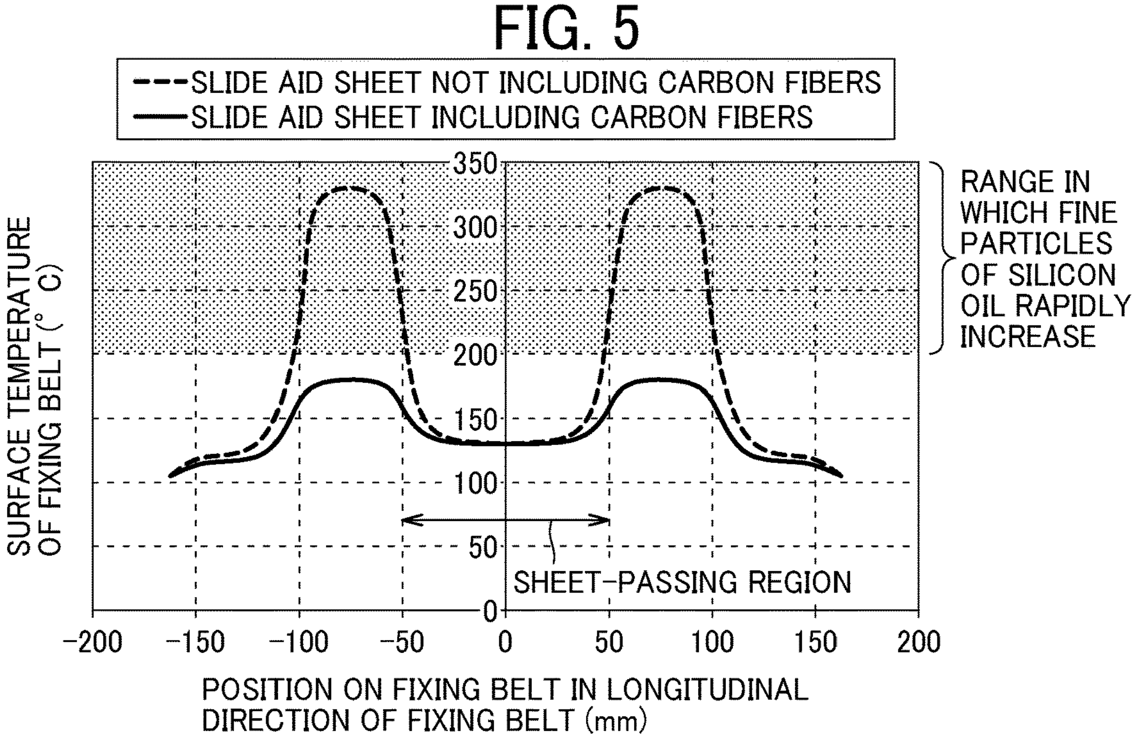
FIG. 5 is a graph illustrating a temperature distribution of a fixing belt in a longitudinal direction of the fixing belt.

FIG. 5 is a graph illustrating results of the experiments. In FIG. 5, the solid line indicates the surface temperature distribution of the fixing belt in the fixing device having the slide aid sheet including the carbon fibers, and the dashed line indicates the surface temperature distribution of the fixing belt in the fixing device having the slide aid sheet not including the carbon fibers.

Using the carbon fibers for the weft 188*b* of the slide aid sheet 188 as described above can reduce the temperature rise at the end portion of the fixing belt 181 that is the non-sheet-passing region of the fixing belt 181 to be equal to or lower than about 180° C. as illustrated by the solid line in FIG. 5. In particular, using carbon nanotubes in the weft 188*b* can reduce the temperature rise at the end portion and greatly enhance the lubricant retention.

As a result, the durability of the slide aid sheet 188 over time can be greatly enhanced. Since the excessive temperature rise at the end portion of the fixing belt can be prevented, the image forming apparatus does not need to reduce the productivity (in other words, reduce copy per minutes (CPM)) to avoid the excessive temperature rise at the end portion of the fixing belt in which the temperature exceeds 300° C. as illustrated by dashed line in FIG. 5. As a result, the slide aid sheet including the carbon fibers can increase the productivity compared with the slide aid sheet not including the carbon fibers.

The weft 188*b* including the carbon fibers transfers heat from the non-sheet-passing region of the fixing belt 181 to a center portion of the fixing belt 181 and prevents the excessive temperature rise in the non-sheet-passing region of the fixing belt 181. In addition, since the heat in the non-sheet-passing region of the fixing belt is effectively used in the center portion of the fixing belt, the above-described structure is useful for energy saving. As a result, the image forming apparatus 100 including the fixing device 18 according to the present embodiment can enhance the energy saving property.

On the other hand, the warp 188*a* conducts heat downstream from the fixing nip N as illustrated in FIGS. 3 and 4 but is made of the heat-resistant resin and has low thermal conductivity. As a result, the above-described structure can reduce the amount of heat transferring downstream from the fixing nip N, which is useful for energy saving.

Carbon nanotubes are described below.

Since the slide aid sheet 188 is made of fabrics, the lubricant retainability is originally good. The weft 188*b* including carbon nanotubes as the carbon fibers further enhances the lubricant retainability of the slide aid sheet 188. Since the carbon nanotube has a cylindrical space extending in the tube, the carbon nanotubes can stably hold a larger amount of lubricant than the heat-resistant fibers.

In addition, the carbon nanotube is tubular and flexible and has elasticity. In combination with the stable retention of the lubricant, the above-described property enhances the sliding property with the fixing belt 181, which largely enhances the durability of the slide aid sheet 188 with time.

Figure 6A:
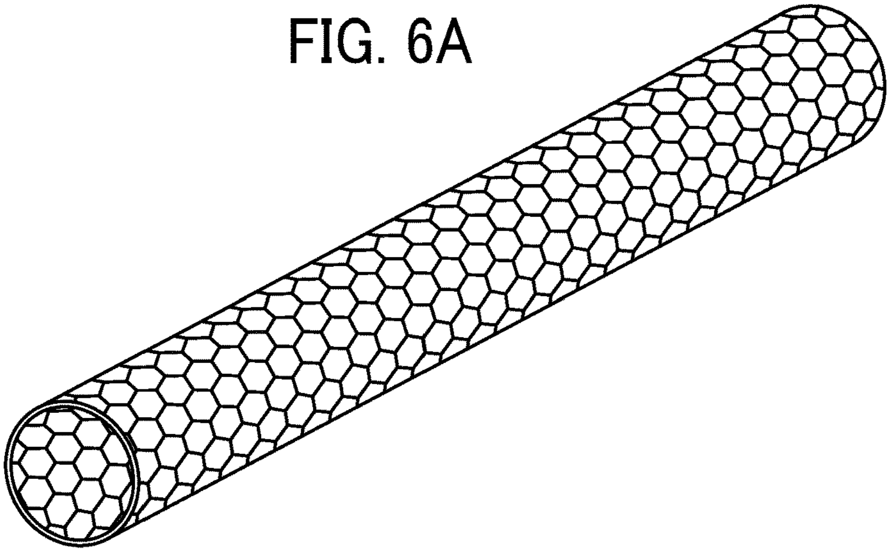
FIG. 6A is a perspective view of a carbon nanotube having a single-layer structure.
Figure 6B:
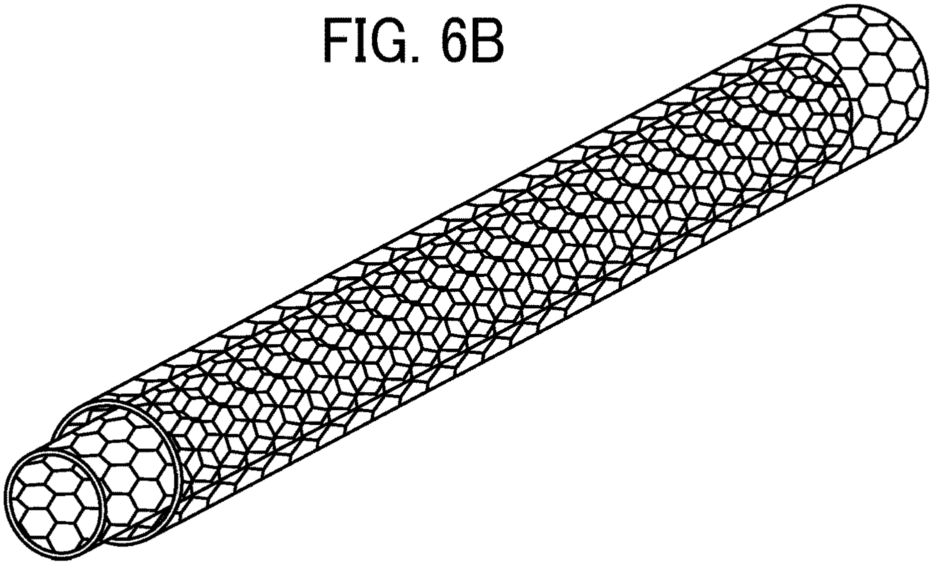
FIG. 6B is a perspective view of a carbon nanotube having a two layer structure.
Figure 6C:
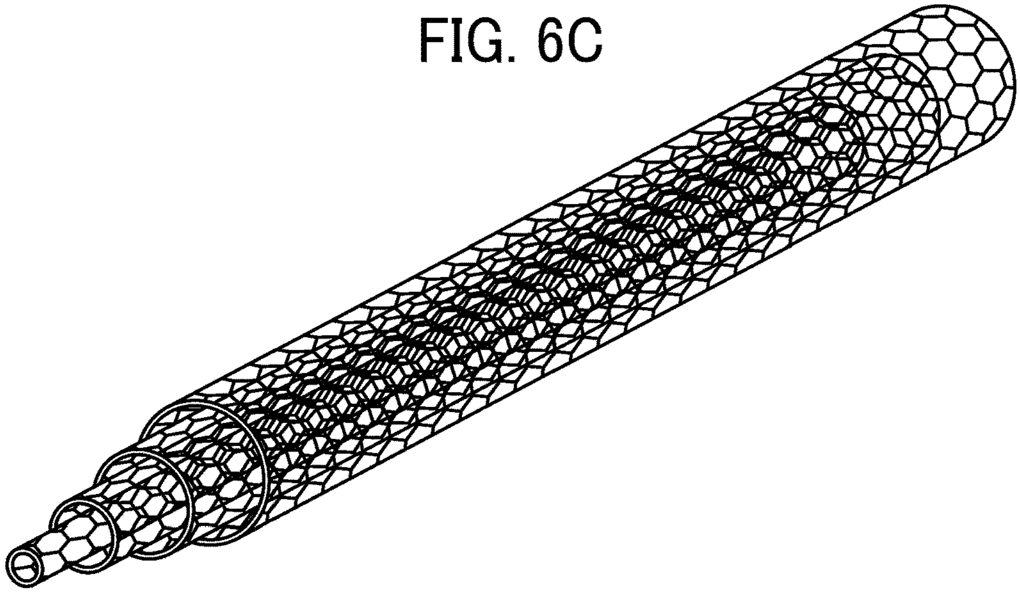
FIG. 6C is a perspective view of a carbon nanotube having a four layer structure.

As illustrated in FIGS. 6A to 6C, the carbon nanotube is a tubular film in which a network of innumerable hexagons (benzene rings) of carbon atoms is bonded in a planar manner. FIG. 6A illustrates a single-layer (single) cylindrical structure as a basic structure of the carbon nanotube. This single-layer structure is referred to as a Single-walled Carbon Nanotube (SWNT).

The lubricant can be held also inside the hexagonal mesh of the cylindrical structure. As a result, the lubricant retainability of the slide aid sheet including the carbon nanotubes is remarkably better than the lubricant retainability of the slide aid sheet made of the heat-resistant resin.

FIG. 6B illustrates a two layer (double) cylindrical structure of the carbon nanotube. This two layer structure is referred to as a Double-walled Carbon Nanotube (DWNT).

Since the number of meshes in the two layer structure is increased by nearly twice that in the single layer structure, the lubricant retention property of the two layer structure is also increased by nearly twice that in the single layer structure.

FIG. 6C illustrates a four layer (quadruple) cylindrical structure of the carbon nanotube. This four layer structure is referred to as a Multi-walled Carbon Nanotube (MWNT). Since the number of meshes in the four layer structure is increased by about three to four times that in the single layer structure, the lubricant retention property is also increased by about three to four times that in the single layer structure.

The carbon nanotube has very high thermal conductivity and heat resistance. Regarding the thermal conductivity (W/mK), the thermal conductivity of the two layer (double) structure of FIG. 6B is higher than that of the single layer (single) structure of FIG. 6A, and the thermal conductivity of the four layer (quadruple) structure of FIG. 6C is higher than that of the two layer (double) structure of FIG. 6B. As the carbon nanotubes are multilayered, the excessive temperature rise can be effectively reduced.

In particular, the weft 188*b* including carbon nanotubes can effectively prevent the excessive temperature rise at the end portion, that is, high temperature in the non-sheet-passing region that occurs when small sheets continuously pass through the fixing device.

Concentration of fine particles generated from the lubricant is described below.

It has been pointed out that ultrafine particles (UFP) having a particle size of less than 100 nm are discharged from an image forming apparatus such as a printer, a copier, a facsimile machine, or a multifunction peripheral (MFP) thereof. The amount of UFP discharged is internationally regulated from the viewpoint of environmental protection (for example, The German Blue Angel Standard).

One of the sources of UFP is lubricant held on the slide aid sheet in the fixing device. The lubricant on the surface of the nip formation pad or the slide aid sheet is evaporated by the temperature rise at the end portion of the fixing belt and condensed. As a result, the UFP is discharged.

Figure 7:
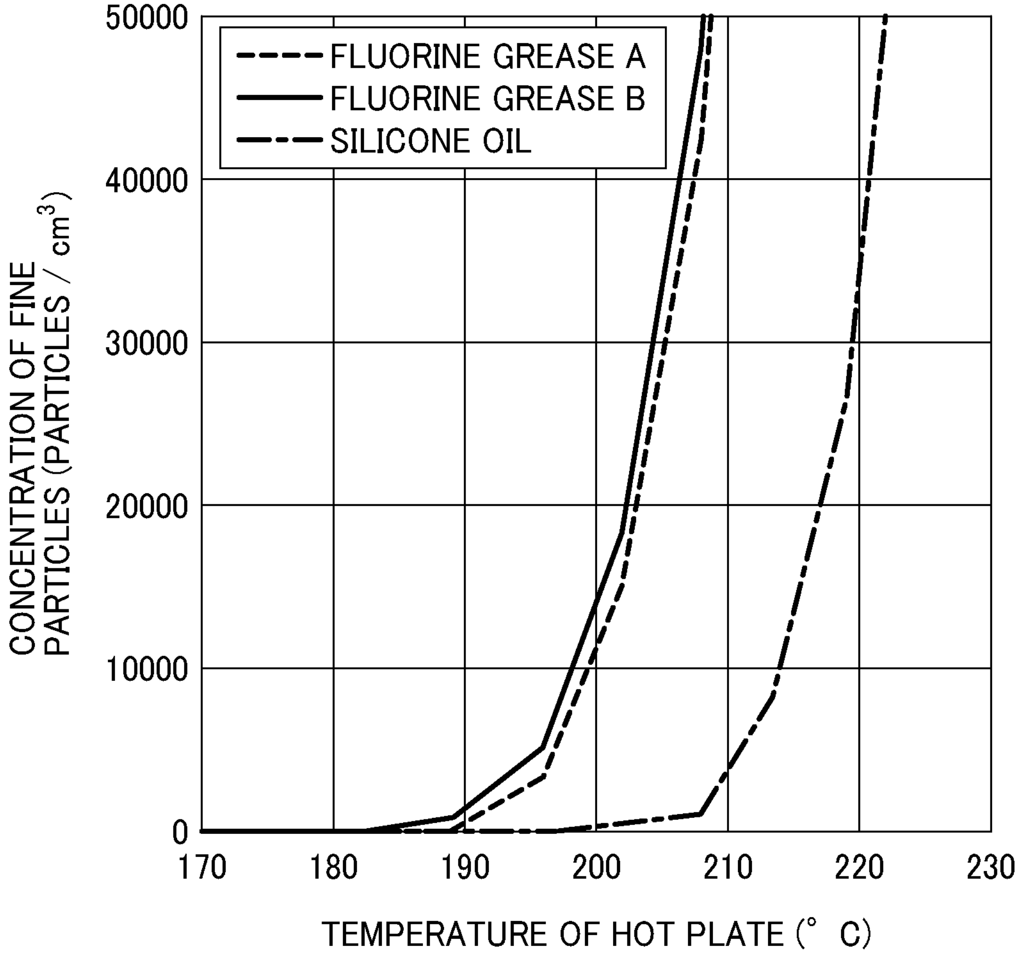
FIG. 7 is a graph illustrating concentrations of fine particles generated from lubricant heated.

In the present embodiment, since the slide aid sheet 188 includes the weft 188*b* including the carbon fibers or the carbon nanotubes to reduce the temperature rise at the end portion of the fixing belt, the above-described configuration can reduce the concentration of the fine particles generated from the lubricant. FIG. 7 is a graph illustrating results of experiments. In the experiments, three types of lubricant (fluorine grease A, fluorine grease B, and silicone oil) were heated by a hot plate, and concentrations of generated fine particles were measured.

As illustrated in FIG. 7, the fluorine greases A and B have a rapid increase in the fine particle concentration when the temperature exceeds 180° C. to 190° C. The concentration of fine particles of silicone oil also rapidly increases when the temperature exceeds 200° C. From this, it is understood that reducing the temperature at the end portion of the fixing belt to be equal to or lower than 180° C. effectively reduces the fine particle concentration.

Since the slide aid sheet 188 in the present embodiment includes the weft 188*b* including the carbon fibers or carbon nanotubes to reduce temperature rise at the end portion of the fixing belt, the above-described configuration in the present embodiment can reduce the concentration of the fine particles generated from the lubricant and can increase the margin of the image forming apparatus 100 with respect to the environmental standard.

The present disclosure has been described above on the basis of the embodiments, but the present disclosure is not limited to the embodiments. Needless to say, various alterations can be made in the scope of the technical idea described in the scope of the claims.

The following describes preferred aspects of the present disclosure.

First Aspect

In a first aspect, a fixing device includes a fixing rotator, a heater, a pressure rotator, a nip formation pad, and a slide aid sheet. The fixing rotator is rotatable in a rotation direction. The heater heats the fixing rotator. The pressure rotator contacts an outer circumferential face of the fixing rotator. The nip formation pad is inside a loop of the fixing rotator to form a nip between the fixing rotator and the pressure rotator. The slide aid sheet is on the nip formation pad and faces the fixing rotator. The slide aid sheet includes a carbon fiber extending in a width direction orthogonal to a rotation direction of the fixing rotator.

Second Aspect

In a second aspect, the slide aid sheet in the fixing device according to the first aspect includes a warp extending in the rotation direction of the fixing rotator and a weft extending in the width direction of the fixing rotator, and the weft includes the carbon fiber.

Third Aspect

In a third aspect, the warp in the fixing device according to the second aspect is made of at least one of a heat-resistant resin or a glass fiber.

Fourth Aspect

In a fourth aspect, the carbon fiber in the fixing device according to any one of the first to third aspects includes at least one of an acrylic fiber carbon fiber or a pitch-based carbon fiber.

Fifth Aspect

In a fifth aspect, the carbon fiber in the fixing device according to any one of the first to fourth aspects includes a carbon nanotube.

Sixth Aspect

In a sixth aspect, the carbon nanotube in the fixing device according to the fifth aspect has a single layer structure or two or more layer structure.

Seventh Aspect

In a seventh aspect, the slide aid sheet in the fixing device according to any one of the first to sixth aspects holds at least one of silicone oil, silicone grease, or fluorine grease.

Eighth Aspect

In an eighth aspect, an image forming apparatus includes the fixing device according to any one of the first to seventh aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device comprising:

a fixing rotator rotatable in a rotation direction;

a heater to heat the fixing rotator;

a pressure rotator contacting an outer circumferential face of the fixing rotator;

a nip formation pad inside a loop of the fixing rotator to form a nip between the fixing rotator and the pressure rotator; and a slide aid sheet, fixed on the nip formation pad, facing the fixing rotator, the slide aid sheet including a carbon fiber extending in a width direction orthogonal to the rotation direction of the fixing rotator, wherein the slide aid sheet includes:

a warp extending in the rotation direction of the fixing rotator; and a weft extending in the width direction of the fixing rotator, and only the weft includes the carbon fiber.

2. The fixing device according to claim 1, wherein the warp is made of at least one of:

a heat-resistant resin; or a glass fiber.

3. The fixing device according to claim 1, wherein the carbon fiber includes at least one of:

an acrylic fiber carbon fiber; or a pitch-based carbon fiber.

4. The fixing device according to claim 1, wherein the carbon fiber includes a carbon nanotube.

5. The fixing device according to claim 4, wherein the carbon nanotube has a two or more layer structure.

6. The fixing device according to claim 4, wherein the carbon nanotube has a single layer structure.

7. The fixing device according to claim 1, wherein the slide aid sheet holds at least one of:

silicone oil, silicone grease, or fluorine grease.

8. An image forming apparatus comprising the fixing device according to claim 1.

* * * * *